US012630287B2

(12) United States Patent (10) Patent No.: US 12,630,287 B2
Ritter et al. (45) Date of Patent: May 19, 2026

(54) AIRCRAFT STRUCTURE HAVING AN IMPROVED INLET OPENING FOR ENGINE AIR

(71) Applicant: Airbus Defence and Space GmbH, Taufkirchen (DE)

(72) Inventors: Sebastian Ritter, Taufkirchen (DE); Robert Ehrmayr, Taufkirchen (DE); Robert Osterhuber, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 179 days.

(21) Appl. No.: 18/386,734

(22) Filed: Nov. 3, 2023

(65) Prior Publication Data

US 2025/0257688 A1 Aug. 14, 2025

(30) Foreign Application Priority Data

Nov. 3, 2022 (DE) .......................... 102022129097.2

(51) Int. Cl.
| | |
|---|---|
| *B64C 30/00* | (2006.01) |
| *B64C 1/00* | (2006.01) |
| *B64D 33/02* | (2006.01) |
| *F02C 7/04* | (2006.01) |
| *B64C 23/00* | (2006.01) |

(52) U.S. Cl.
CPC ................ *B64C 30/00* (2013.01); *B64C 1/00* (2013.01); *F02C 7/04* (2013.01); *B64C 23/005* (2013.01); *B64C 2230/20* (2013.01); *B64D 2033/0226* (2013.01); *B64D 2033/026* (2013.01)

(58) Field of Classification Search
CPC ...... B64D 2033/026; B64D 2033/0226; B64C 30/00
See application file for complete search history.

(56) References Cited

U.S. PATENT DOCUMENTS

| | | | |
|---|---|---|---|
| 5,779,189 A | 7/1998 | Hamstra |
| 2007/0136032 A1 | 6/2007 | Leland |
| 2007/0181743 A1 | 8/2007 | Klinge |
| 2016/0288917 A1 | 10/2016 | Huynh |
| (Continued) | | | |

FOREIGN PATENT DOCUMENTS

| | | |
|---|---|---|
| CN | 104384288 A | 3/2015 |
| CN | 109899178 A | 6/2019 |
| (Continued) | | |

OTHER PUBLICATIONS

German Office Action for Application No. 102022129097 dated Oct. 18, 2023.

(Continued)

*Primary Examiner* — Nicholas McFall
(74) *Attorney, Agent, or Firm* — KDW Firm PLLC

(57) ABSTRACT

An aircraft structure having a fuselage, an engine and an air inlet for receiving air for the engine. The air inlet has a cowl which surrounds an inlet opening. The air inlet has a compression surface and a transition shoulder. The air inlet additionally has a flow guide surface, which is arranged as a local elevation in a region of the transition shoulder and extends into the inlet opening. This flow guide surface designed as a local elevation contributes to improving the displacement of the boundary layer of a fluid flowing along the aircraft structure at the air inlet.

9 Claims, 4 Drawing Sheets

(56) References Cited

U.S. PATENT DOCUMENTS

2016/0376018 A1   12/2016  Troia et al.
2021/0261266 A1*   8/2021  Ehrmayr ................... B64C 7/00

FOREIGN PATENT DOCUMENTS

| | | | |
|---|---|---|---|
| DE | 3447141 | A1 | 7/1986 |
| DE | 69714977 | T2 | 4/2003 |
| DE | 69715303 | T2 | 4/2003 |
| DE | 102020004273 | A1 | 8/2021 |
| EP | 0888497 | B1 | 8/2002 |
| EP | 3412563 | A1 | 12/2018 |
| EP | 3871980 | A1 | 9/2021 |
| WO | 2022095163 | A1 | 5/2022 |

OTHER PUBLICATIONS

European Search Report for Application No. 23206577 dated Feb. 12, 2024.

* cited by examiner

AIRCRAFT STRUCTURE HAVING AN IMPROVED INLET OPENING FOR ENGINE AIR

TECHNICAL FIELD

The description relates to an aircraft structure, in particular for a supersonic aircraft, and particularly concerns the configuration of an air inlet for receiving air for an engine.

BACKGROUND

Jet engines are supplied with air and a fuel in order to generate drive energy for an aircraft therefrom. The air is received from the surroundings of the aircraft and is fed to the jet engine via an inlet opening.

For high performance levels or a high drive power of the jet engine, it is advantageous if the inlet flow, that is to say the air received into the inlet opening, has a high degree of energy. In order to achieve this, elevations (or bumps) can be arranged on the outer surface of the aircraft and are placed with respect to the inlet openings in such a way that the boundary layer of the flow, which is generated on the outer skin of the aircraft, is deflected away from the inlet opening. The flow boundary layer typically has a lower energy than an air flow spaced apart from the aircraft. By thus deflecting the boundary layer fluid away from the inlet opening, an air flow of higher energy is received into the inlet opening in order to be fed to the jet engine.

U.S. Pat. No. 5,779,189 describes a jet aircraft having an inlet opening for engine air. The inlet opening is either arranged laterally on the fuselage of the jet aircraft and in front of the wing or on an underside of the wing and at a distance from the fuselage of the jet aircraft. On or shortly in front of the inlet opening there is arranged an elevation, or a bump, which deflects away from the inlet opening the boundary layer fluid of the air layer bearing on the jet aircraft.

EP 3 871 980 A1 describes an aircraft structure having an inlet opening for engine air, in which an air inlet has an elevation arranged in a transition region between a wing and the fuselage, and in which the elevation between the surface of the wing and the surface of the fuselage is asymmetrical.

SUMMARY

It can be considered as the object to improve the air inlet for the engine of an aircraft structure, in particular by improving the displacement of the boundary layer at the air inlet.

This object is achieved with the subject matter herein and following description.

According to one aspect, an aircraft structure is specified. The aircraft structure has a fuselage, an engine and an air inlet. The air inlet includes an inlet opening for receiving air for the engine and a cowl surrounding the inlet opening. The air inlet furthermore comprises a compression surface and a transition shoulder, which are arranged and designed to deflect a boundary layer of an air flow from the inlet opening during the operation of the aircraft structure with as little loss and as efficiently as possible. The air inlet furthermore has a flow guide surface, wherein the flow guide surface is arranged as a local elevation in a region of the transition shoulder and extends into the inlet opening. The flow guide surface, in a cross-sectional view (z-y plane) of the aircraft structure, is distinguished by a width and a height relative to the transition shoulder. The flow guide surface, in the cross-sectional view (z-y plane) together with the transition shoulder, forms a first contour line in the transverse direction (i.e. a contour line in the circumferential direction of the fuselage). The first contour line on the flow guide surface is distinguished by a change in the curvature profile.

The aircraft structure is suitable in particular for use on a jet aircraft. The description herein applies generally to an aircraft structure and a jet aircraft having such an aircraft structure or a jet aircraft whose structure is configured according to the principles described herein.

Even though in the present case only the construction of an individual air inlet on one side of the aircraft structure is described, it should be understood that a plurality of such air inlets, which are constructed according to the same principles, that is, each of which has at least one flow guide surface described here as a local elevation, may also be arranged on the aircraft structure.

The air inlet may be configured as what is referred to as a belly inlet or side inlet. The belly inlet is located on the underside of the aircraft structure. The underside is understood as meaning that surface which points downward during a typical orientation of the aircraft structure in flight or in a parking position, wherein, in this system of coordinates, the directional details top/bottom refer to the vector of the Earth's gravitational force. The directional detail "bottom" points toward the Earth's surface; "top" points away therefrom.

The air inlet can be arranged laterally or on an upper surface of the fuselage, or on the wing or at a transition region between the wing and fuselage.

The air inlet is configured to receive air from the surroundings and to feed it to an engine, in particular a jet engine, and, in combination with a fuel or propellant, to generate drive energy for the aircraft. The air is channeled from the air inlet to the engine via suitable mechanisms which are known in principle.

The air inlet refers in the present case to the entirety of the structural and functional elements which, individually and/or in their interaction, ensure that air is received from the surroundings and supplied for further use in the engine. In particular, the air inlet includes a compression surface and a transition shoulder which rise with respect to the surface of the fuselage. The function of the compression surface and the transition shoulder is to deflect from an opening of the air inlet a boundary layer fluid of a low-energy boundary layer forming on the outer surface of the aircraft structure in flight. The boundary layer contains a low-energy air flow. For a jet engine, it is advantageous to supply air flow of higher energy in order to improve the performance of the jet engine. Since the compression surface and the transition shoulder deflect the air of the boundary layer (the boundary layer fluid) around the opening of the air inlet or deflect it away from the opening of the air inlet, air flow of higher energy can enter the opening.

In addition to the compression surface and the transition shoulder, a flow guide surface is arranged as a local elevation at least on the transition shoulder, which contributes to the improvement in the displacement of the boundary layer fluid.

The compression surface and the transition shoulder are formed by deformations of the surface of the fuselage. These deformations affect the flow of the boundary layer. The compression surface and the transition shoulder can be formed by deformation of the surface without arranging an additional element at or on the surface of the fuselage. In principle, however, the compression surface and the transition shoulder can also be individually shaped independently of the aircraft structure and attached and suitably fastened as an additional element to the fuselage and/or wing.

In connection with supersonic aircraft, the compression surface and the transition shoulder can also have the function of contributing to the slowing down of the air flow for the engine to subsonic speed.

The flow guide surface constitutes an additional local elevation on the surface of the transition shoulder. This local elevation causes a change in the pressure gradient of the flowing fluid at the surface of the transition shoulder, because the flow guide surface has an additional displacing effect on the flowing fluid.

The additional flow guide surface has the advantage that the boundary layer displacement is improved. Thus, the inlet opening of the air inlet can be smaller in size compared to an air inlet without this additional flow guide surface.

Essentially, the fuselage of an aircraft forms a curvature profile in the transverse direction, in which the outer surface forms an outer contour line. In the transverse direction or in a cross-sectional view, the contour line is substantially circular or elliptical. The cross-sectional view is defined by a sectional plane in what is referred to as the z-y plane and may also be referred to as a lateral section.

The additional flow guide surface on the transition shoulder changes the curvature profile. Thus, the curvature profile changes at the transition from the transition shoulder to the flow guide surface. If, for example, the curvature profile of the contour line is to the left on the transition shoulder, there is a change to a right-curved portion at the transition to the flow guide surface in order to form the height of the flow guide surface. Then a left-curved portion follows again to approximate the flow guide surface to the surface of the transition shoulder. If the flow guide surface then returns to the surface of the transition shoulder, this is done again via a right-curved portion before the outer contour line is then formed by the transition shoulder.

In the cross-sectional view, for example, the flow guide surface is arranged in the vicinity of or at the vertex of the transition shoulder. The elevation formed by the flow guide surface is limited in the transverse direction, i.e. the flow guide surface has a predetermined width.

In particular, the elevation is configured such that its height corresponds at least to the expected boundary layer thickness during the flight mode.

The flow guide surface may, for example, be arranged in the plane of symmetry of the air inlet. This is particularly advantageous for air inlets on an underside of the aircraft fuselage. In the case of air inlets arranged on the side of the aircraft fuselage, the flow guide surface may also be arranged outside the plane of symmetry of the air inlet.

According to one embodiment, the first contour line along the transition shoulder and over the flow guide surface changes its direction of curvature at least once.

The direction of curvature changes in particular along the first contour line at a transition from the transition shoulder to the flow guide surface and at a transition from the flow guide surface back to the transition shoulder.

According to a further embodiment, the first contour line is more greatly curved at the flow guide surface than at the transition shoulder.

This means that the local elevation along the first contour line is distinguished by a higher curvature value than the transition shoulder on the left and right next to the flow guide surface. The curvature value is understood here as meaning the deviation of the contour line from a straight line. The greater this deviation, the greater the curvature value. As a result, the flow guide surface forms a local elevation on the transition shoulder, which is more greatly curved in the transverse direction or in a cross-sectional view of the fuselage than the same contour line along the transition shoulder. A contour line in the transverse direction of the fuselage extends in what is referred to as the z-y plane of an aircraft. If reference is made here to the same contour line, this refers to a contour line that runs in a z-y plane along the surface of the fuselage including the air inlet and the surfaces that border the inlet opening.

According to a further embodiment, the flow guide surface extends into the inlet opening in a longitudinal sectional view of the aircraft structure.

The flow guide surface thus extends substantially along the longitudinal direction of the fuselage of the aircraft structure. The flow guide surface forms an elongate local elevation (extending in the longitudinal direction of the fuselage) arranged on the surface of the transition shoulder.

The longitudinal sectional view is defined by a sectional plane in what is referred to as the z-x plane and may also be referred to as a vertical section.

According to a further embodiment, a front end of the flow guide surface in the longitudinal sectional view of the aircraft structure protrudes over a front edge of the cowl from the inlet opening.

This means that the front end of the flow guide surface is arranged further forward in the flight direction than the front edge of the cowl of the air inlet. In another embodiment, the front end of the flow guide surface in the longitudinal sectional view of the aircraft structure is approximately at the height of the front edge of the cowl or just behind it.

In particular, the cowl has a front edge swept forward, but is not limited to this design. The front edge may also be swept backward or not swept at all. The front end of the flow guide surface is arranged in particular further forward than the frontmost point of the front edge of the cowl.

According to a further embodiment, the flow guide surface in the longitudinal sectional view together with the compression surface and the transition shoulder forms a second contour line in the longitudinal direction, wherein the second contour line is distinguished by an increasing amount of inclination at the front end of the flow guide surface and along the longitudinal axis of the aircraft structure.

In the longitudinal direction, the local elevation of the flow guide surface begins at its front edge and arises from the compression surface or the transition shoulder. Within the width of the flow guide surface, the surface of the fuselage experiences a local elevation and an increasing inclination, which is higher than on the left and right (in the lateral sectional view) next to the flow guide surface.

According to a further embodiment, the second contour line has an increased surface inclination at the transition from the compression surface to the transition shoulder, compared to a contour line in the longitudinal direction, which is located outside the width of the flow guide surface.

The front edge of the flow guide surface or the region in which the flow guide surface arises from the compression surface or the transition shoulder and forms the elevation contributes to an accumulating effect of the flow, as a result of which the displacement effect of the boundary layer fluid improves.

According to a further embodiment, the flow guide surface expands in the flow direction, in a bottom view of the aircraft structure.

The bottom view is defined in what is referred to as the x-y plane. In this plane, a sectional view, which may also be referred to as a horizontal section, can also be seen. In this horizontal section, the flow guide surface expands in the flow direction the further the flow direction extends to the rear. In other words, the width to which reference was made in the cross-sectional view increases in the direction of the rear end and along the longitudinal axis of the aircraft structure.

According to a further embodiment, the flow guide surface has a longitudinal axis, wherein the longitudinal axis of the flow guide surface runs parallel to a flow direction of the air in the inlet opening.

The local flow conditions in the air inlet depend, inter alia, on the positioning of the air inlet on the aircraft (e.g. belly inlet, side inlet). The orientation of the flow guide surface (orientation of the longitudinal axis of the flow guide surface with respect to the local flow direction) is designed in particular in such a way that, under all flight conditions, the flow guide surface is aligned in terms of flow as parallel as possible to the flow direction.

According to a further embodiment, the air inlet has a flow divider, wherein the flow divider is arranged in the inlet opening and the inlet opening is divided into at least two regions, wherein the flow guide surface is arranged at a forward end of the flow divider.

In this variant, the flow guide surface is arranged on the flow divider. However, the flow guide surface may also be used without a flow divider.

The flow divider divides the inlet opening into a left region and a right region, and therefore the one inlet opening is divided into two regions. In the inlet opening, the flow divider extends as a planar element along the longitudinal direction of the fuselage of the aircraft structure. The flow divider may be swept forward, swept backward, or not swept at all.

BRIEF DESCRIPTION OF THE DRAWINGS

Further details will be described with reference to the figures. The figures are schematic and not to scale.

DETAILED DESCRIPTION

Figure 1:
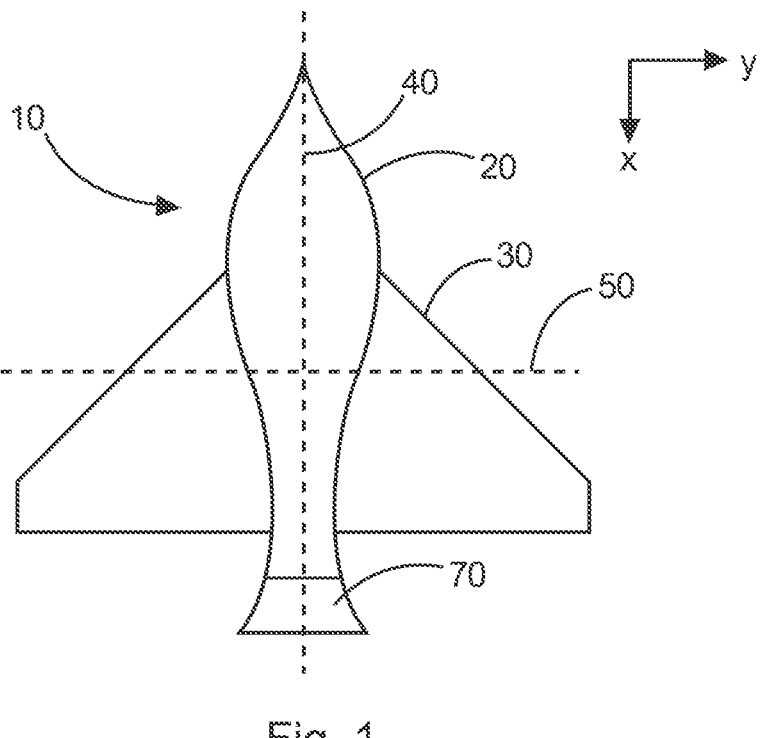
FIG. 1 shows a schematic illustration of an aircraft structure in top view.

FIG. 1 shows an aircraft structure 10 having a fuselage 20 and two wings 30 which are arranged laterally on opposite sides of the fuselage 20. In the illustration of FIG. 1, the longitudinal axis 40 of the aircraft structure 10 extends from the top (tip of the aircraft structure, at the front in the sense of the flight direction) to the bottom (tail of the aircraft structure, at the rear in the sense of the flight direction). The transverse axis 50 of the aircraft structure extends transversely with respect to the longitudinal axis 40 and from wing to wing.

The aircraft structure 10 has one or more engines 70. The engines can be arranged at various positions on the aircraft structure. The illustration of FIG. 1 is to be seen merely by way of example. The engines 70 are supplied with air from the surroundings of the aircraft structure. The air is used together with a fuel in order to provide drive energy.

The aircraft structure 10 of FIG. 1 can be part of an aircraft, in particular an aircraft having a jet engine, further in particular of a supersonic aircraft.

The illustration of the aircraft structure 10 in FIG. 1 is by way of an example in that the air inlet described here with its components can be used in differently configured aircraft structures. The air inlet described herein with its components can also be used in aircraft structures that deviate from the structure shown in FIG. 1.

Figure 2:
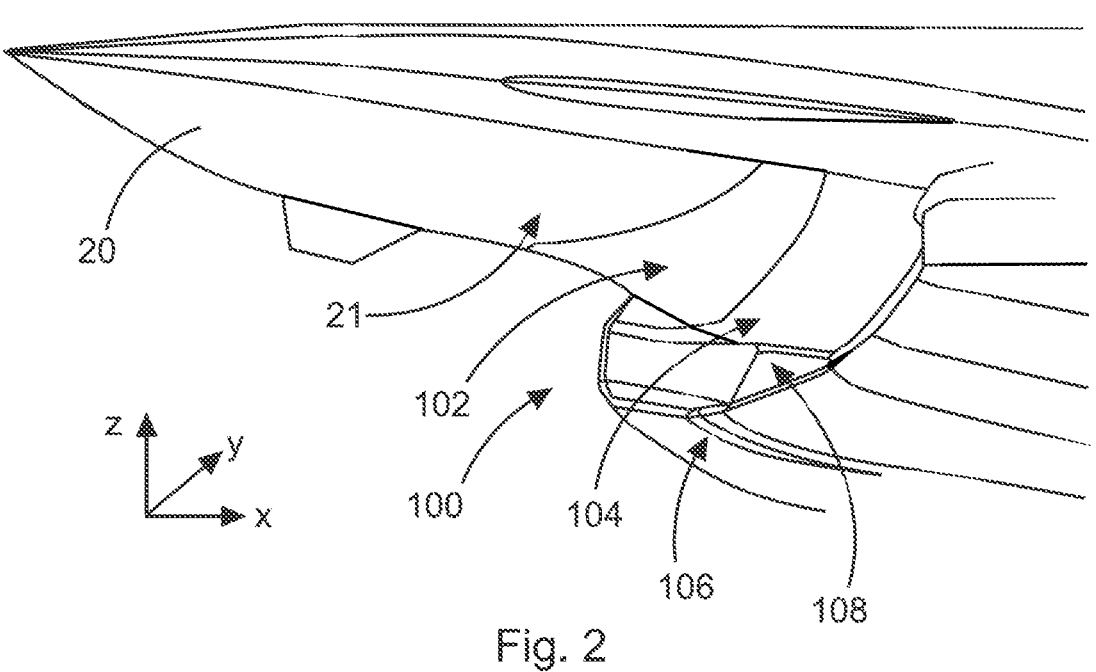
FIG. 2 shows a schematic illustration of an aircraft structure with an air inlet on the underside.

FIG. 2 shows a detailed illustration of an example air inlet 100 on the underside of a fuselage 20. This illustration shows the coordinates x, y, z, which correspond to the three spatial axes. These coordinates define the longitudinal axis (x, shown in FIG. 1 with the reference numeral 40), the transverse axis (y), and the vertical axis (z).

The underside of the fuselage 20 is formed by the surface 21. In flight, air flows along the surface 21. A boundary layer fluid is formed on the surface 21. This boundary layer fluid should be deflected away from the air inlet or its inlet opening 107 (see FIG. 3). For this purpose, a compression surface 102 and a transition shoulder 104 are provided which, on the surface 21, form relative elevations, which are arranged along the longitudinal axis x in front of the inlet opening.

In the example of FIG. 2, the air inlet 100 has a cowl 106, which surrounds the inlet opening. A flow divider 108 is arranged in the inlet opening.

FIG. 2 shows an air inlet of an aircraft structure for comprehension purposes. However, it should be understood that the flow guide surface described herein can be used not only with an air inlet, as described in FIG. 2. On the contrary, the flow guide surface can also be used in an air inlet without a flow divider.

Figure 3:
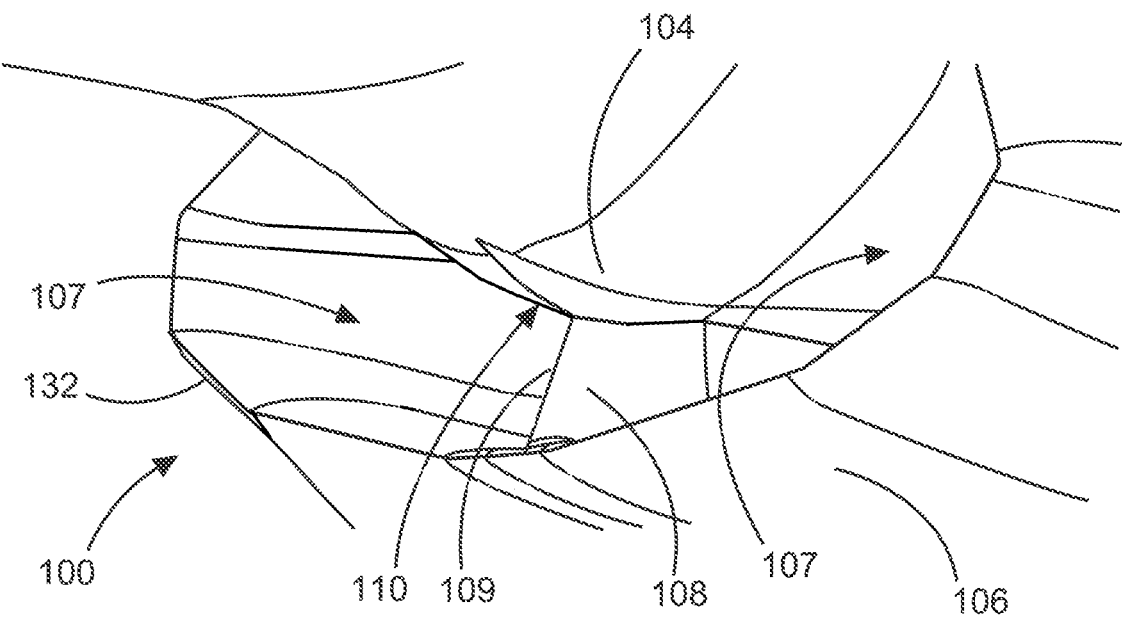
FIG. 3 shows a schematic illustration of an aircraft structure with an air inlet containing a flow guide surface.

FIG. 3 shows an air inlet 100 from FIG. 2 supplemented by the flow guide surface 110. In this example, the flow guide surface 110 is arranged at a forward end 109 of the flow divider 108 and forms a local elevation on the transition shoulder 104 at this point.

The flow divider 108 divides the air inlet such that two air inlet openings 107 are formed and are delimited from each other by the flow divider 108 within the cowl 106.

In this example, the front edge 132 of the cowl 106 is swept forward. Likewise, the flow divider 108 or its forward end 109 in this example is swept forward.

The flow guide surface 110 designed as a local elevation on the transition shoulder 104 will now be described in more detail with reference to FIGS. 4 to 8.

Figure 4:
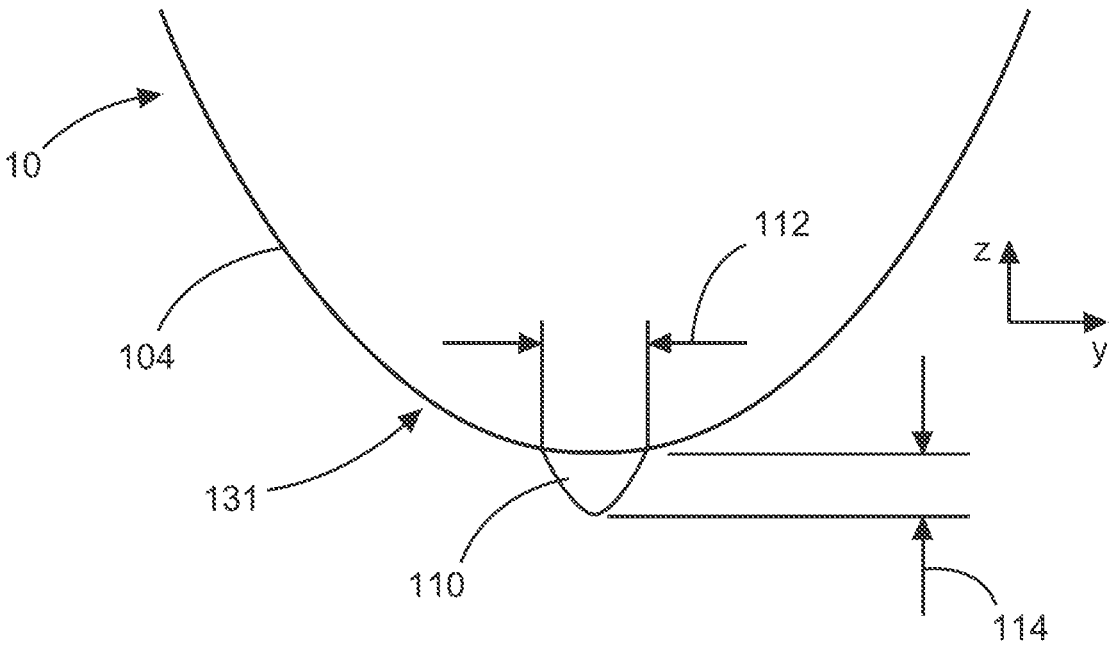
FIG. 4 shows a schematic illustration of a lateral portion of an aircraft structure with a transition shoulder and a flow guide surface arranged thereon.

FIG. 4 shows a cross-sectional view or a lateral section in the z-y plane of the aircraft structure 10. Depending on where the cross section is formed along the longitudinal axis x, the flow guide surface 110 is or is not in the sectional surface. In FIG. 4, the sectional surface is positioned in such a way that the section runs through the flow guide surface 110. The flow guide surface 110 has a width 112 (extent in the y direction) and a height 114 (extent in the z direction starting from the surface of the transition shoulder).

The outer line of the transition shoulder 104 and of the flow guide surface 110 forms the first contour line 131. This first contour line runs in the circumferential direction of the aircraft structure. This first contour line 131 has a changing curvature profile.

Starting on the left side of FIG. 4 and then moving counter-clockwise, the first contour line follows a left curvature. At the point at which the flow guide surface 110 arises from the compression surface 102 or from the transition shoulder 104, the elevation formed by the flow guide surface forms and the first contour line passes into a right-hand curvature. Then the curvature direction changes again to a left-hand curvature, which also forms the highest point of the flow guide surface 110. Now the first contour line again merges into a right-hand curvature and approaches the transition shoulder 104, with the transition shoulder 104 then further following a left-hand curvature. Without the flow guide surface, the transition shoulder 104 forms a left-hand curvature in the cross-sectional illustration without changing the direction of curvature. By changing the direction of curvature, as described herein, a local elevation is formed on the transition shoulder 104.

At the transition from the compression surface 102 to the transition shoulder 104, in the y-z plane on the left and right next to the flow guide surface and outside the width 112 of the flow guide surface 110, there is a decrease in the amount of inclination of the second contour line in the x direction, whereas, at the front end of the flow guide surface, the inclination of the second contour line initially increases to form the elevation of the flow guide surface 110.

This structure can contribute to achieving an improved pressure gradient in the circumferential direction of the aircraft fuselage. The local elevation of the flow guide surface 110 increases a pressure gradient, which ensures a displacement effect of the flow.

As can be gathered from FIG. 4, the flow guide surface 110, in the cross-sectional view, can be located in the vicinity of the vertex of the transition shoulder 104. The flow guide surface 110 may also, however, be arranged laterally offset from the vertex.

The surface of the flow guide surface 110 is more greatly curved in the circumferential direction than the surface of the transition shoulder 104. This prevents the boundary layer from thickening in the vicinity of the vertex and prevents the boundary layer from accumulating on the flow guide surface 110.

Figure 5:
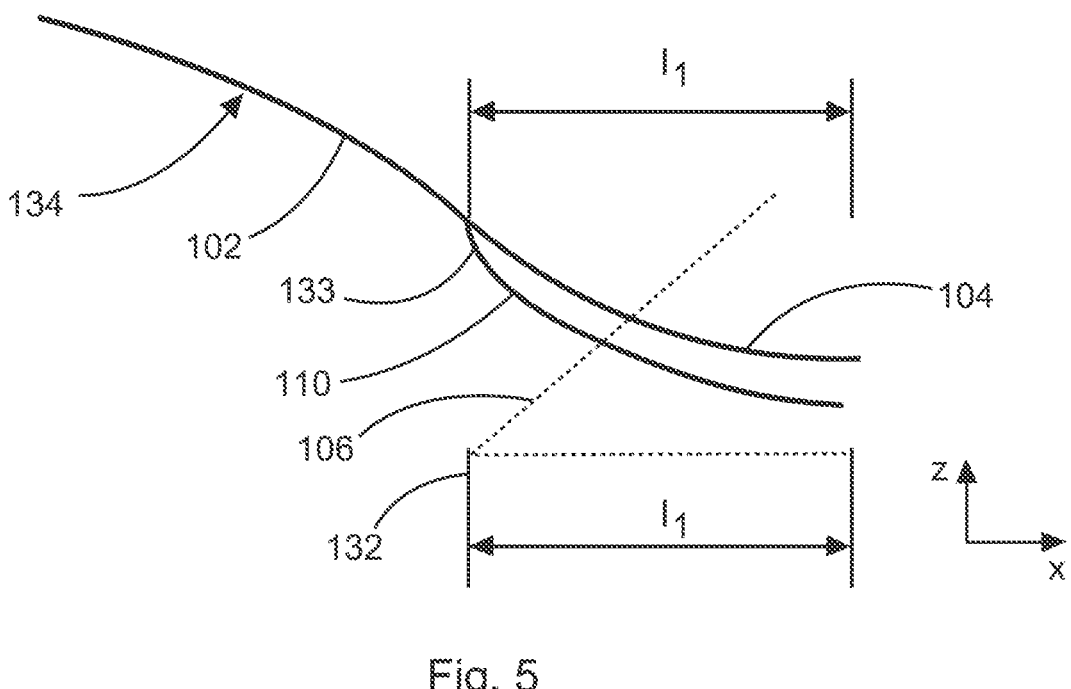
FIG. 5 shows a schematic illustration of a longitudinal section of an aircraft structure with a compression surface and a transition shoulder and with a flow guide surface arranged on the transition shoulder.

FIG. 5 shows a longitudinal sectional view or a vertical section of the aircraft structure in the z-x plane. The surface of the compression surface 102, the transition shoulder 104 and the flow guide surface 110 form the second contour line 134 along the longitudinal axis x.

In the direction of the longitudinal axis x, the second contour line 134 runs along the compression surface 102, to the transition shoulder 104 and over the flow guide surface 110. Depending on where the front end 133 of the flow guide surface 110 is arranged with respect to the compression surface 102 and the transition shoulder 104, it may be that the second contour line 134 merges from the compression surface 102 directly onto the flow guide surface 110. This means that the flow guide surface 110 may have its front end 133 at the transition of the compression surface 102 and transition shoulder 104, or else before or after this transition.

This design achieves an improved pressure gradient in the longitudinal direction or flow direction, i.e. the current flow. A boundary layer displacement takes place over a larger extent.

In this example, the current-flow extent (extent along the x axis, marked with $(I_1)$ of the flow guide surface 110 corresponds approximately to the current-flow extent (extent along the x axis, also marked with $I_1$) of the forwardly swept front edge 132 of the cowl 106 (the front edge 132 is shown by dashed lines).

Figure 6:
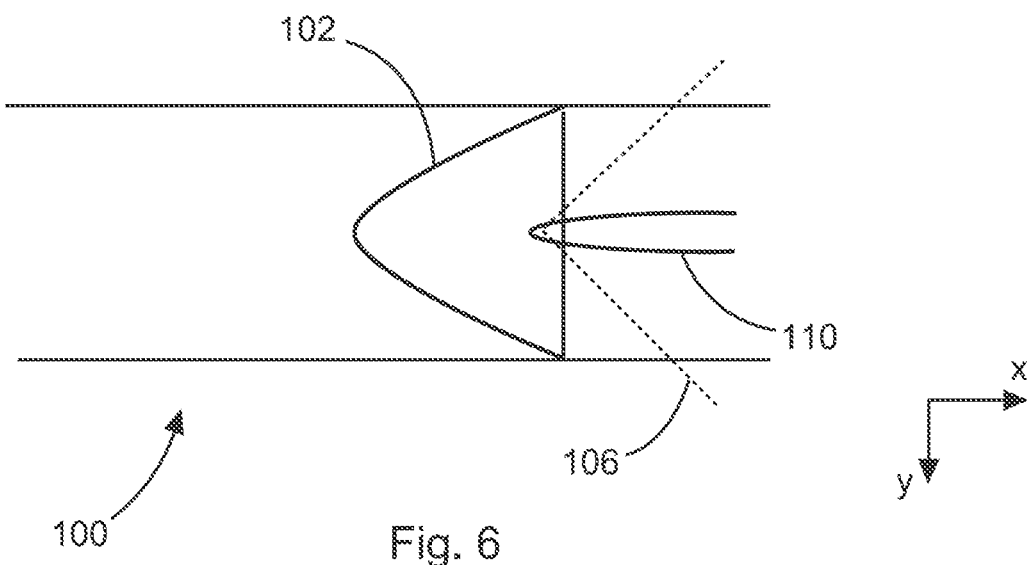
FIG. 6 shows a schematic illustration of a bottom view of an aircraft structure with a compression surface and a flow guide surface.

FIG. 6 shows a bottom view of an air inlet 100 in order to illustrate the structure of the flow guide surface 110 from this perspective. The flow guide surface 110 is arranged further to the rear along the x axis than the compression surface 102, wherein the front end of the flow guide surface 110 is arranged at almost the same height as the front edge of the cowl 106, which is shown by dashed lines.

In this perspective, it can be seen that the width of the flow guide surface 110 increases in the x direction, and the flow guide surface 110 expands to the rear. For example, the flow guide surface is wedge-shaped in the bottom view.

Figure 7:
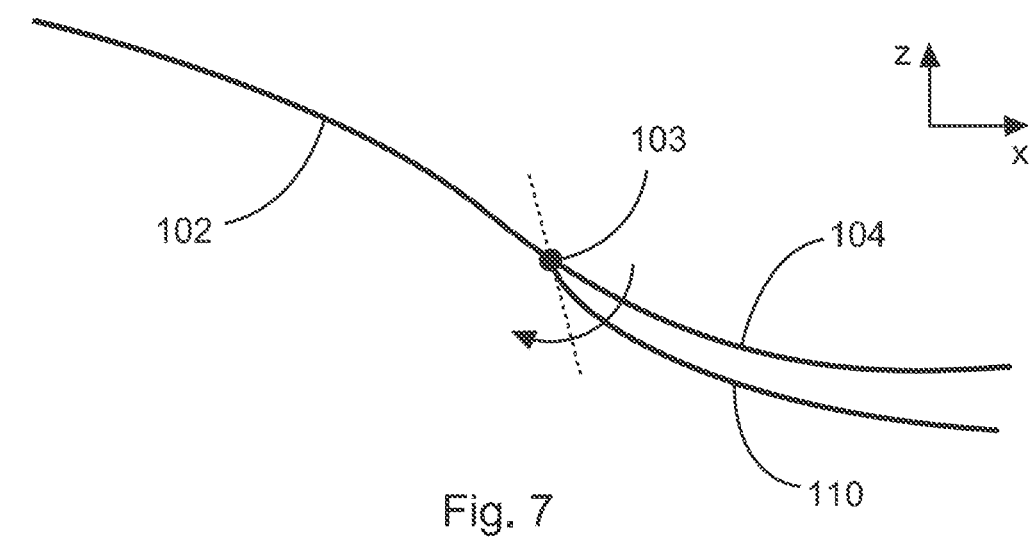
FIG. 7 shows a schematic illustration of a longitudinal section of an aircraft structure with a compression surface and a transition shoulder and with a flow guide surface arranged on the transition shoulder.

FIG. 7 shows a detailed illustration of a longitudinal section in the z-x plane, similar to FIG. 5. FIG. 7 shows the second contour line which is formed by the compression surface 102 and after the transition 103 from the flow guide surface 110. This sectional view of FIG. 7 runs through the flow guide surface 110. A sectional view which is positioned in the y direction such that it does not run through the flow guide surface 110 has a deviating second contour line which is formed only by the compression surface 102 and the transition shoulder 104 (without a flow guide surface 110). This deviating second contour line can also be gathered from FIG. 7, because the transition shoulder 104 is also drawn in.

The flow guide surface 110 forms a local elevation, which rises from the transition shoulder 104. At the front edge of the flow guide surface 110, i.e. at the transition 103, the surface inclination increases, as shown by the two dashed lines. This has an accumulating effect on the boundary layer fluid and improves the displacement effect on the boundary layer fluid.

Figure 8:
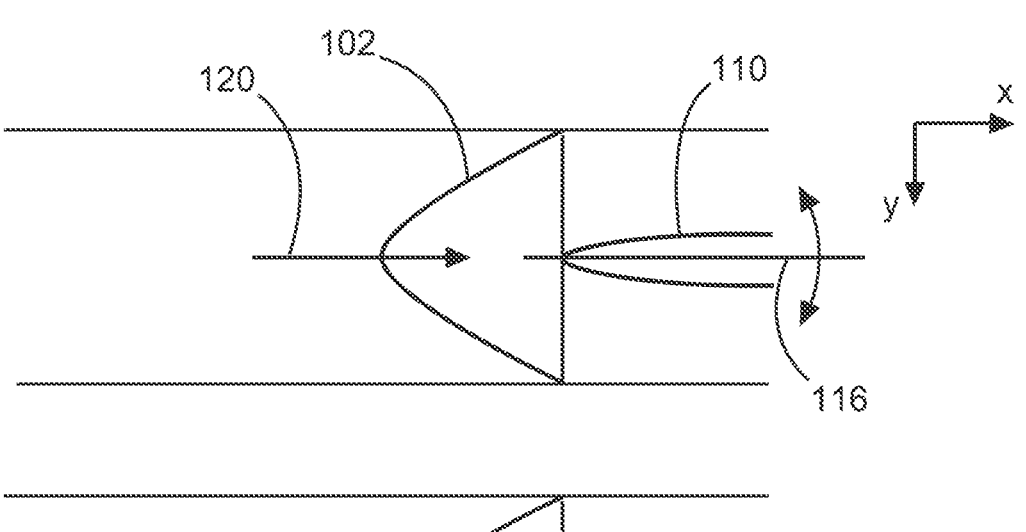
FIG. 8 shows a schematic illustration of two different configurations of a bottom view of an aircraft structure with a compression surface and a flow guide surface.
Figure 8:
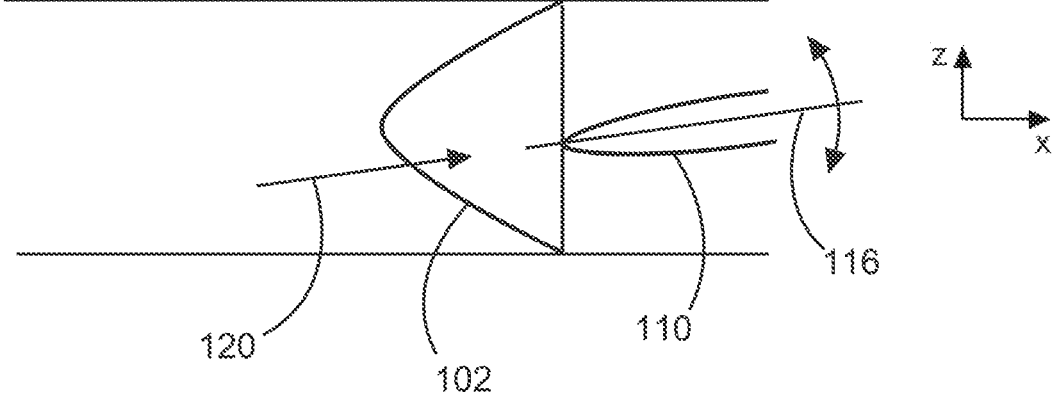

FIG. 8 shows, in a bottom view (y-x plane of the aircraft structure) and a side view (y-z plane of the aircraft structure), two different orientations of the longitudinal axis 116 of the flow guide surface 110 relative to the longitudinal axis x of the aircraft structure. For orientation purposes, respective compression surfaces 102 are also shown here.

In the top illustration of FIG. 8, the longitudinal axis 116 of the flow guide surface 110 runs parallel to the longitudinal axis x of the aircraft structure. The orientation of the flow guide surface 110 (that is, the orientation of the longitudinal axis of the flow guide surface 110 relative to the local flow direction) is designed in particular in such a way that, under all flight conditions, the flow guide surface 110 is aligned in terms of flow as parallel as possible to the flow direction. This flow direction 120 is significantly influenced by the position and orientation of the air inlet on the fuselage of the aircraft structure.

In the bottom illustration, the longitudinal axis 116 of the flow guide surface 110 runs obliquely to the longitudinal axis x of the aircraft structure because the air inlet is arranged on the fuselage in such a way that the flow direction 120 at the air inlet is not parallel to the longitudinal axis x of the fuselage, but rather deviates therefrom.

However, it is advantageous if the longitudinal axis 116 of the flow guide surface 110 runs parallel to the flow direction 120 of the air flow.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft structure
20 fuselage
21 surface
30 wing
40 longitudinal axis
50 transverse axis
70 engine
100 air inlet
102 compression surface
103 transition
104 transition shoulder
106 cowl
107 inlet opening
108 flow divider
109 forward end
110 flow guide surface
112 width
114 height
116 longitudinal axis
120 flow direction
131 first contour line, contour line in transverse direction
132 front edge of the cowl
133 front end of the flow guide surface
134 second contour line, contour line in longitudinal direction
x longitudinal direction
y transverse direction
z vertical direction

The invention claimed is:

1. An aircraft structure comprising:
a fuselage;
an engine;
an air inlet with an inlet opening for receiving air for the engine and a cowl surrounding the inlet opening;
wherein the air inlet comprises a compression surface and a transition shoulder, which are configured to deflect a boundary layer of an air flow from the inlet opening during operation of the aircraft structure;
wherein the air inlet has a flow guide surface;
wherein the flow guide surface is configured as a local elevation in a region of the transition shoulder and extends into the inlet opening;
wherein the flow guide surface, in a cross-sectional view of the aircraft structure, is distinguished by a width and a height relative to the transition shoulder;
wherein the flow guide surface, in the cross-sectional view together with the transition shoulder, forms a first contour line in a transverse direction;

wherein the first contour line on the flow guide surface is distinguished by a change in a curvature profile;
wherein the flow guide surface extends into the inlet opening in a longitudinal sectional view of the aircraft structure; and
wherein a front end of the flow guide surface in the longitudinal sectional view of the aircraft structure protrudes over a front edge of the cowl from the inlet opening.

2. The aircraft structure of claim 1, wherein the first contour line along the transition shoulder and over the flow guide surface changes its direction of curvature at least once.

3. The aircraft structure of claim 1, wherein the first contour line is more greatly curved at the flow guide surface than at the transition shoulder.

4. The aircraft structure of claim 1, wherein the flow guide surface in the longitudinal sectional view together with the compression surface and the transition shoulder forms a second contour line in a longitudinal direction; and
wherein the second contour line is distinguished by an increasing amount of inclination at the front end of the flow guide surface and along a longitudinal axis of the aircraft structure.

5. The aircraft structure of claim 4, wherein the second contour line has an increased surface inclination at a transition from the compression surface to the transition shoulder, compared to a contour line in the longitudinal direction, which is located outside a width of the flow guide surface.

6. The aircraft structure of claim 1, wherein the flow guide surface expands in the flow direction, in a bottom view of the aircraft structure.

7. The aircraft structure of claim 1, wherein the flow guide surface has a longitudinal axis; and
wherein the longitudinal axis of the flow guide surface runs parallel to a flow direction of the air in the inlet opening.

8. The aircraft structure of claim 1, wherein the air inlet has a flow divider;
wherein the flow divider is in the inlet opening and the inlet opening is divided into at least two regions; and
wherein the flow guide surface is at a forward end of the flow divider.

9. An aircraft structure comprising:
a fuselage;
an engine;
an air inlet with an inlet opening for receiving air for the engine and a cowl surrounding the inlet opening;
wherein the air inlet comprises a compression surface and a transition shoulder, which are configured to deflect a boundary layer of an air flow from the inlet opening during operation of the aircraft structure;
wherein the air inlet has a flow guide surface;
wherein the flow guide surface is configured as a local elevation in a region of the transition shoulder and extends into the inlet opening;
wherein the flow guide surface, in a cross-sectional view of the aircraft structure, is distinguished by a width and a height relative to the transition shoulder;
wherein the flow guide surface, in the cross-sectional view together with the transition shoulder, forms a first contour line in a transverse direction;
wherein the first contour line on the flow guide surface is distinguished by a change in a curvature profile;
wherein the air inlet has a flow divider;
wherein the flow divider is in the inlet opening and the inlet opening is divided into at least two regions; and wherein the flow guide surface is at a forward end of the
flow divider.

* * * * *